(12) United States Patent
Micali et al.

(10) Patent No.: US 12,331,241 B2
(45) Date of Patent: Jun. 17, 2025

(54) HEAT TRANSFER MIXTURES

(71) Applicant: HT MATERIALS SCIENCE (IP) LIMITED, Dublin (IR)

(72) Inventors: Francesco Micali, Lecce (IT); Arturo De Risi, Lecce (IT); Piero Negro, Torchiarolo (IT)

(73) Assignee: HT Materials Science (IP) Limited, Dublin (IE)

( * ) Notice: Subject to any disclaimer, the term of this patent is extended or adjusted under 35 U.S.C. 154(b) by 114 days.

(21) Appl. No.: 17/689,101

(22) Filed: Mar. 8, 2022

(65) Prior Publication Data

US 2023/0287254 A1 Sep. 14, 2023

(51) Int. Cl.
| | |
|---|---|
| *C09K 5/20* | (2006.01) |
| *B82Y 30/00* | (2011.01) |
| *B82Y 40/00* | (2011.01) |
| *C09K 5/10* | (2006.01) |
| *C09K 5/14* | (2006.01) |

(52) U.S. Cl.
CPC ............... *C09K 5/20* (2013.01); *C09K 5/10* (2013.01); *C09K 5/14* (2013.01); *B82Y 30/00* (2013.01); *B82Y 40/00* (2013.01)

(58) Field of Classification Search
CPC ... C09K 5/08; C09K 5/10; C09K 5/14; C09K 5/20; C23F 11/00; C23F 11/12; C23F 11/167; C23F 11/1673; C23F 11/1676; C02F 5/00; C02F 5/04; C02F 5/14; B82Y 30/00; B82Y 40/00; C09D 11/00; C09D 11/06; C09D 11/14
See application file for complete search history.

(56) References Cited

U.S. PATENT DOCUMENTS

| | | | |
|---|---|---|---|
| 5,782,962 A | * | 7/1998 | Burke .............. C09G 1/10 106/11 |
| 6,432,320 B1 | | 8/2002 | Bonsignore et al. |
| 6,695,974 B2 | | 2/2004 | Withers et al. |
| 6,783,746 B1 | | 8/2004 | Zhang et al. |
| 6,858,157 B2 | | 2/2005 | Davidson et al. |
| 7,071,258 B1 | | 7/2006 | Jang et al. |
| 7,348,298 B2 | | 3/2008 | Zhang et al. |
| 7,871,533 B1 | | 1/2011 | Haiping et al. |
| 8,216,541 B2 | | 7/2012 | Jang et al. |
| 8,222,190 B2 | | 7/2012 | Zhamu et al. |
| 8,501,318 B2 | | 8/2013 | Jang et al. |
| 9,469,542 B2 | | 10/2016 | Bozalina et al. |

(Continued)

FOREIGN PATENT DOCUMENTS

| | | |
|---|---|---|
| KR | 10-2338939 B1 * | 12/2021 |
| WO | 2014207091 A1 | 12/2014 |
| WO | 2020191449 A1 | 10/2020 |

OTHER PUBLICATIONS

"Detection and Sizing of Submicron Particles in Biologics With Interferometric Scattering Microscopy", Journal of Pharmaceutical Sciences 109, 881-890 (Year: 2020).*

(Continued)

*Primary Examiner* — Matthew R Diaz
*Assistant Examiner* — Jiajia Janie Cai
(74) *Attorney, Agent, or Firm* — Sorell, Lenna & Schmidt, LLP (57) ABSTRACT

A heat transfer mixture includes a base fluid, a dispersant, a stabilizing agent, aluminum oxide nanoparticles and exfoliated graphite nanoplatelets.

19 Claims, 3 Drawing Sheets

$$\frac{hd}{k} = 0.023 \left(\frac{jd}{\mu}\right)^{0.8} \left(\frac{\mu c_p}{k}\right)^n$$

Where:

$d$ is the hydraulic diameter $k$ is the thermal conductivity of the bulk fluid $\mu$ is the fluid viscosity $j$ is the mass flux $c_p$ is the isobaric heat capacity of the fluid $n$ is 0.4 for heating (wall hotter than the bulk fluid) and 0.33 for cooling (wall cooler than the bulk fluid)

(56) References Cited

U.S. PATENT DOCUMENTS

| | | | |
|---|---|---|---|
| 9,770,709 | B2 | 9/2017 | Swager et al. |
| 9,879,167 | B2 | 1/2018 | Atieh et al. |
| 9,919,926 | B2 | 3/2018 | Wada et al. |
| 10,723,927 | B1* | 7/2020 | De Risi ............... C09K 5/14 |
| 10,994,327 | B2 | 5/2021 | Cabanas Corrales et al. |
| 2002/0100578 | A1 | 8/2002 | Withers et al. |
| 2004/0206491 | A1 | 10/2004 | Davidson et al. |
| 2005/0218370 | A1 | 10/2005 | Egawa et al. |
| 2007/0158609 | A1 | 7/2007 | Hong et al. |
| 2007/0158610 | A1 | 7/2007 | Hong et al. |
| 2008/0302998 | A1 | 12/2008 | Hong et al. |
| 2010/0147188 | A1 | 6/2010 | Mamak et al. |
| 2010/0187469 | A1 | 7/2010 | Srinivasan et al. |
| 2012/0186789 | A1* | 7/2012 | Sedarous ............... C09K 5/10 977/734 |
| 2014/0312263 | A1* | 10/2014 | Timofeeva ............ C09K 5/20 252/74 |
| 2016/0376486 | A1 | 12/2016 | Atieh et al. |
| 2020/0231906 | A1* | 7/2020 | Bull .................. C11D 17/0021 |
| 2021/0087449 | A1 | 3/2021 | De Risi et al. |

OTHER PUBLICATIONS

"Graphene nanoplatelets xGnP M-5", Sigma-Aldrich (Year: 2023).*
"Material Safety Data Sheet Trade name: xGnP® Graphene Nanoplatelets", XG Sciences (Year: 2010).*
"Aluminum Oxide Nanopowder / Nanoparticles (Al2O3, alpha, High Purity 99.9%, 200nm)", US Research Nanomaterials, Inc. (Year: 2023).*
"Exfoliated Graphite Nanoplatelets (XGnP) Based Nanocomposites: Its Past, Present, and Future", American Society of Composites—30th Technical Conference. (Year: 2015).*
"Rheological and Thermal Properties of Exfoliated Graphite Nanoplatelets-Filled Impact Modified Polypropylene Nanocomposites", Kiziltas et al., Polymer Composites 39 (S3): E1512-E1519, 2018 (Year: 2018).*
KR 10-2338939 B1 translation. (Year: 2021).*
V. Selvaraj and H. Krishnan, Synthesis of graphene encased alumina and its application as nanofluid for cooling of heat-generating electronic devices, Powder Technology (2020), vol. 363, Mar. 1, 2020, pp. 665-675.
Nizar Ahammed, Entropy generation analysis of graphene-alumina hybrid nanofluid in multiport minichannel heat exchanger coupled with thermoelectric cooler. International Journal of Heat and Mass Transfer. vol. 103, Dec. 2016, pp. 1084-1097.
Gao, Y, et al., Experimental Investigation of Specific Heat of Aqueous Graphene Oxide Al2O3 Hybrid Nanofluid, Thermal Science 2021 vol. 25, Issue 1 Part B, pp. 515-525.
Guoqiang Yang et al., Preparation and Thermal Conductivity of Alumina Reduced Graphene Oxide Composite Dispersed Aqueous Nanofluids, 2018 IOP Conf. Ser.: Mater. Sci. Eng. 381 012071.
V. Selvaraj and H. Krishnan, Synthesis of Graphene Encased Alumina and its Application as Nanofluid for Cooling of Heat-Generating Electronic Devices. Power Technology (2020), vol. 363, Mar. 1, 2020, pp. 665-675.
Vivek Kumar, et al., Thermal and Thermo-Hydraulic Behaviour of Alumina-Graphene Hybrid Nanofluid in Minichannel Heat Sink: An Experimental Study, Aug. 2021: International Journal of Energy Research 45 (09).
Yuguo Gao, et al., Thermal Conductivity and Stability of Novel Aqueous Graphene Oxide-Al2O3 Hybrid Nanofluids for Cold Energy Storage, Applied Sciences, vol. 10, Issue 17, 5768, pp. 1-23.

* cited by examiner

| Heat Transfer Mixture | Base Fluid v/v | Dispersant v/v | Stabilizing v/v | Solid Phase v/v |
|---|---|---|---|---|
| Water alumina | 94.40-99.98 | 0.001-0.58 | 0.001-0.48 | 0.01-5.00 |
| Hybrid Gex | 94.90-99.99 | 0 | 0.00037-0.184 | 0.01-5.00 |
| Hybrid AL-Gex | 89.32-99.97 | 0.001-0.58 | 0.0013-0.67 | 0.01-10 |
|  |  |  |  |  |
|  |  |  |  |  |
| Heat Transfer Mixture | Base Fluid w/w | Dispersant w/w | Stabilizing w/w | Solid Phase w/w |
| Water alumina | 82.4-99.96 | 0.001-0.58 | 0.001-0.48 | 0.039-17.38 |
| Hybrid Gex | 99.69-99.99 | 0 | 0.0004-0.1844 | 0.006-2.6 |
| Hybrid AL-Gex | 79.21-99.95 | 0.0002-0.85 | 0.0015-0.65 | 20.4 |

FIG. 1

| Dispersant | Examples |
|---|---|
| Anionic | Sodium dodecyl sulfate (SDS), sodium dodecylbenzene sulphonate (SDBS), sodium stearate, etc., Polymethyl methacrylate (PMMA) |
| Cationic | Cetyl trimethyl ammonium bromide (CTAB), benzalkonium chloride, cetylpyridinium chloride (CPC), benzalkonium chloride (BAC), benzethonium chloride (BZT), dimethyl dioctadecyl ammonium chloride, dioctadecyl dimethylammonium bromide (DODAB), etc. |
| Nonionic | Triton X-100, polyvinyl pyrrolidone (PVP), Tween 80, oleic acid, polyoxyethylene, etc. |
| Amphoteric | Lecithin, sodium lauroamphoacetate, hydroxysultaine, etc. |

FIG. 2

$$\frac{hd}{k} = 0.023 \left(\frac{jd}{\mu}\right)^{0.8} \left(\frac{\mu c_p}{k}\right)^n$$

Where:

$d$ is the hydraulic diameter $k$ is the thermal conductivity of the bulk fluid $\mu$ is the fluid viscosity $j$ is the mass flux $c_p$ is the isobaric heat capacity of the fluid $n$ is 0.4 for heating (wall hotter than the bulk fluid) and 0.33 for cooling (wall cooler than the bulk fluid)

FIG. 3

| Heat Transfer Mixture | Base Fluid v/v | Dispersant v/v | Stabilizing v/v | Solid Phase v/v |
|---|---|---|---|---|
| 1 | 94.40-99.98 | 0.001-0.58 | 0.001-0.48 | 0.01-5.00 |
| 2 | 94.90-99.99 | 0 | 0.00037-0.184 | 0.01-5.00 |
| 3 | 89.32-99.97 | 0.001-0.58 | 0.0013-0.67 | |
| | | | | |
| | | | | |
| Heat Transfer Mixture | Base Fluid w/w | Dispersant w/w | Stabilizing w/w | Solid Phase w/w |
| 1 | 82.4-99.96 | 0.001-0.58 | 0.001-0.48 | 0.039-17.38 |
| 2 | 99.69-99.99 | 0 | 0.0004-0.1844 | 0.006-2.6 |
| 3 | 79.21-99.95 | 0.0002-0.85 | 0.0015-0.65 | 20.4 |

HEAT TRANSFER MIXTURES

TECHNICAL FIELD

The present disclosure relates, in general, to nanofluids, and more particularly, to heat transfer mixtures for use in a thermal system that include a bicomponent solid phase comprising aluminum oxide nanoparticles and exfoliated graphite nanoplatelets.

BACKGROUND

For well over a century, working fluids have included a solid phase having micro-sized particles with high thermal conductivity to increase thermal characteristics of the working fluids. However, micro-sized particles can be abrasive and can precipitate out due to their higher mass. More recently, nano-sized particles were used in conjunction with a base liquid to provide a nanofluid. In particular, copper, aluminum, or carbon based nanoparticles have been used to create colloidal suspension fluids with enhanced thermal characteristics.

Conventional nanofluids have shown varying degrees of increase in thermal performance due to the addition of the nanoparticles to the thermal fluid. Many conventional nanofluids include a solid phase having copper (II) oxide (CuO) nanoparticles due to the favorable thermal properties of copper (II) oxide powders. However, nanofluids having a solid phase with copper (II) oxide nanpoparticles suffer from several drawbacks that can impede its commercial use in a thermal system. Additionally, the copper (II) oxide nanoparticles tend to agglomerate and/or stick to components of the thermal system, which can lead to impairment and fouling of fluid flow in the system. In addition, the blackish color of the fluids available on the market is less than desirable than the lighter colored fluid of the present application.

Nanofluids have also been developed that include a solid phase having aluminum or aluminum oxide nanoparticles. However, such nanofluids are single component nanofluids since the solid phase of such nanofluids includes only one type of solid particle, such as, for example, aluminum nanoparticles or aluminum oxide nanoparticles. These conventional nanofluids thus lack other types of solid particles in their solid phase that may interact with the solid particles in the solid phase, such as, for example, aluminum nanoparticles or aluminum oxide nanoparticles to increase the heat transfer capacity of the nanofluid.

As such, a need currently exists for a commercially viable nanofluid that includes a bicomponent solid phase, can be easily mass produced, has effective thermal properties, and is relatively stable and re-dispersible during use. This disclosure describes an improvement over these prior art technologies.

SUMMARY

In one embodiment, in accordance with the principles of the present disclosure, a nanofluid, such as, for example, a heat transfer mixture includes a base fluid, a dispersant, a stabilizing agent, aluminum oxide nanoparticles and exfoliated graphite nanoplatelets (GEX).

Figure 1:
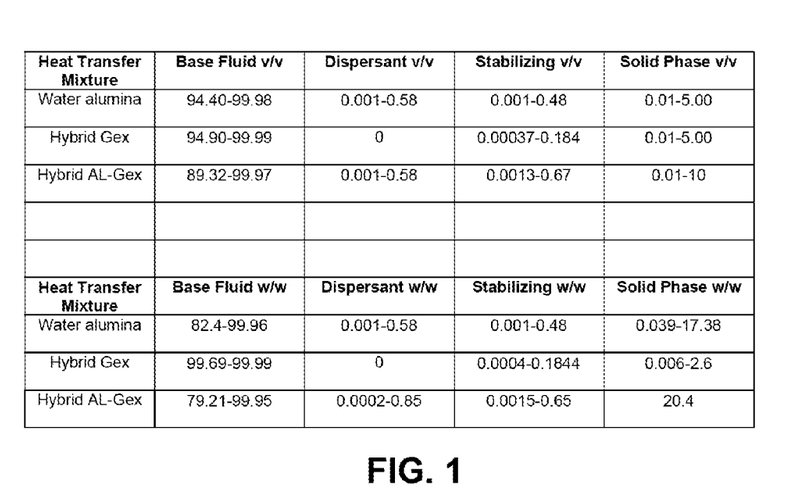
FIG. 1 is a table showing formulations of heat transfer fluids in accordance with the principles of the present disclosure.

In some embodiments, the base fluid comprises water. In some embodiments, the base fluid comprises water and ethylene glycol. In some embodiments, the base fluid comprises water and propylene glycol. In some embodiments, the base fluid consists of water. In some embodiments, the base fluid consists of water and ethylene glycol. In some embodiments, the base fluid consists of water and propylene glycol. In some embodiments, the base fluid comprises between about 89.32 and about 99.97% of the heat transfer mixture by volume (See, FIG. 1). In some embodiments, the base fluid comprises between 89.32 and about 99.97% of the heat transfer mixture by volume. In some embodiments, the base fluid comprises between 79.21 and 99.95 of the heat transfer mixture by weight.

Figure 2:
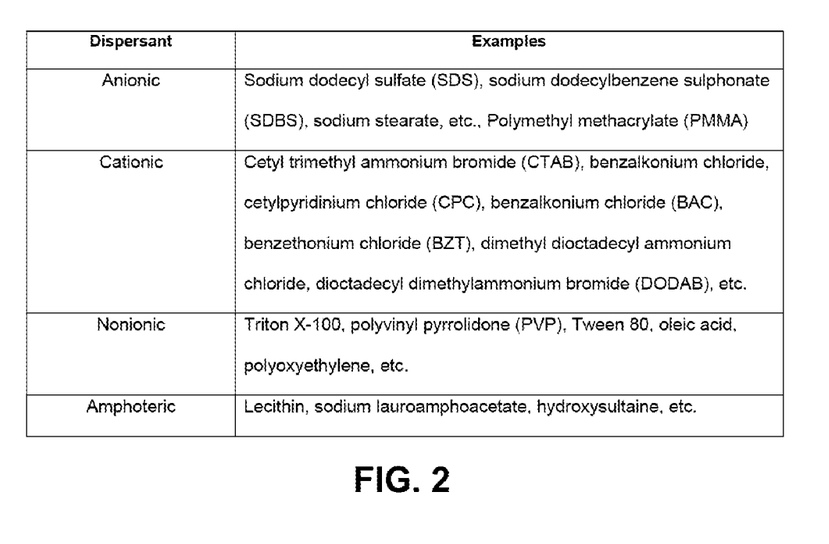
FIG. 2 is a table showing dispersants of heat transfer fluids in accordance with the principles of the present disclosure.

In some embodiments, the dispersant comprises one or more dispersants from the table shown in FIG. 2. In some embodiments, the dispersant consists of one or more dispersants from the table shown in FIG. 2. In some embodiments, the dispersant comprises between 0.002% and 0.58% of the heat transfer mixture by volume. In some embodiments, the dispersant comprises between 0.001% and 0.58% of the heat transfer mixture by weight. In some embodiments, the dispersant functions to modify the zeta potential and the surface repulsion between particles.

In some embodiments, the stabilizing agent comprises a wetting agent, such as, for example, polyglycol ether and/or a rheology viscosifier, such as, for example, polysaccharide phospholipids.

In some embodiments, the stabilizing agent consists of Polyglycol ether, Polysaccharide, and/or Phospholipids. In some embodiments, the stabilizing agent comprises between 0.001% and 0.67% of the heat transfer mixture by volume. In some embodiments, the stabilizing agent comprises between 0.001% and 0.65% of the heat transfer mixture by weight. In some embodiments, the stabilizing agent functions to reduce the surface tension of the base fluid around the particle surface and to modify the viscosity of the base fluid.

In some embodiments, the aluminum oxide nanoparticles comprise between about 0.01% and about 5% of the heat transfer mixture by volume. In some embodiments, the aluminum oxide nanoparticles comprise between 1% and 2% of the heat transfer mixture by volume. In some embodiments, the aluminum oxide nanoparticles comprise between about 0.039% and about 17.38% of the heat transfer mixture by weight. In some embodiments, the aluminum oxide nanoparticles comprise between 4% and 7.8% of the heat transfer mixture by weight. In some embodiments, the aluminum oxide nanoparticles have a particle size between about 100 nanometers and about 800 nanometers. In some embodiments, the aluminum oxide nanoparticles have a particle size between 100 nanometers and 600 nanometers. In some embodiments, the aluminum oxide nanoparticles have an average particle size between about 200 nanometers and 600 nanometers. In some embodiments, the aluminum oxide nanoparticles have an average particle size between 200 nanometers and 450 nanometers.

In some embodiments, the exfoliated graphite nanoplatelets comprise between about 0.01% and about 5% of the heat transfer mixture by volume. In some embodiments, the exfoliated graphite nanoplatelets comprise between 0.5% and 1.5% of the heat transfer mixture by volume. In some embodiments, the exfoliated graphite nanoplatelets comprise between about 0.006% and about 2.6% of the heat transfer mixture by weight. In some embodiments, the exfoliated graphite nanoplatelets comprise between 0.29% and 0.87% of the heat transfer mixture by weight. In some embodiments, the exfoliated graphite nanoplatelets comprise less than 0.03% of the heat transfer mixture by weight. In some embodiments, the exfoliated graphite nanoplatelets are between about 5 nanometers and about 10 nanometers in thickness and between about 5,000 nanometers and about 50,000 nanometers in length. In some embodiments, the exfoliated graphite nanoplatelets are between 5 nanometers and 10 nanometers in thickness and between 5,000 nanometers and 50,000 nanometers in length. In some embodiments, the exfoliated graphite nanoplatelets have a specific surface area higher than about 30 nanometers m²/g. In some embodiments, the exfoliated graphite nanoplatelets have a specific surface area less than 60 nanometers m²/g.

In one embodiment, in accordance with the principles of the present disclosure, a heat transfer mixture includes a base fluid, a dispersant, a stabilizing agent, aluminum oxide nanoparticles and exfoliated graphite nanoplatelets having a specific surface area higher than 30 m²/g and/or less than 60 m²/g. The base fluid comprises between about 89.32% and about 99.97% of the heat transfer mixture by volume, the base fluid being selected from the group consisting of water, water and ethylene glycol and water and propylene glycol. The dispersant comprises between about 0.001% and about 0.58% of the heat transfer mixture by volume, the dispersant being selected from the group consisting of ionic, non ionic, cationic, amphoteric. The stabilizing agent comprises between about 0.0013% and about 0.67% of the heat transfer mixture by volume, the stabilizing agent being selected from the group consisting of Wetting agent and rheology viscosifiers. The aluminum oxide nanoparticles comprise between about 1% and about 2% of the heat transfer mixture by volume. The exfoliated graphite nanoplatelets are between about 5 nanometers and about 10 nanometers in thickness and between about 5,000 nanometers and about 50,000 nanometers in length, the exfoliated graphite nanoplatelets comprising between about 0.5% and about 2% of the heat transfer mixture by volume.

In one embodiment, in accordance with the principles of the present disclosure, a heat transfer mixture consists of a base fluid, a dispersant, a stabilizing agent, aluminum oxide nanoparticles and exfoliated graphite nanoplatelets having a specific surface area higher than 30 m²/g and/or less than 60 m²/g. The base fluid comprises between 89.32% and 99.97% of the heat transfer mixture by volume, the base fluid being selected from the group consisting of water, water and ethylene glycol and water and propylene glycol. The dispersant comprises between 0.001% and 0.58% of the heat transfer mixture by volume, the dispersant being selected from the group consisting of ionic, non ionic, cationic, amphoteric. The stabilizing agent comprises between 0.001% and 0.67% of the heat transfer mixture by volume, the stabilizing agent being selected from the group consisting of Wetting agent and rheology viscosifiers. The aluminum oxide nanoparticles comprise between 1% and 2% of the heat transfer mixture by volume. The exfoliated graphite nanoplatelets are between 5 nanometers and 10 nanometers in thickness and between 5,000 nanometers and 50,000 nanometers in length, the exfoliated graphite nanoplatelets comprising between 0.5% and 2% of the heat transfer mixture by volume.

BRIEF DESCRIPTION OF THE DRAWINGS

The present disclosure will become more readily apparent from the specific description accompanied by the following drawings, in which.

Like reference numerals indicate similar parts throughout the figures.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. The ranges disclosed herein can include any of the upper limits of the ranges in combination with any of the lower limits of the ranges. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of nanofluids, such as, for example, heat transfer mixtures, in accordance with the principles of the present disclosure. Alternate embodiments are also disclosed. Reference will now be made in detail to the exemplary embodiments of the present disclosure.

A nanofluid is a suspension or mixture comprising two phases, a solid phase and a liquid phase, in which the dimensions of the solid phase components in suspension are nanometric. The two phases of the mixture or suspension are also separable through mechanical methods, since the substances used to form the mixture or suspension do not modify their structure, as is the case, for example, in solutions.

In many nanofluids known to the state of the art, the single component nanoparticles/nanopowders of the solid phase have a tendency to deposit due to gravity. This is a phenomenon that has several consequences because it causes a reduction of the volumetric concentration of the nanoparticles/nanopowders inside the nanofluid, thus making the thermal and fluid properties of the nanofluid inferior to what would be expected. Furthermore, in an unstable nanofluid having a single component solid phase, the nanoparticles/nanopowders tend to accumulate inside the pipes of a thermal system when the nanofluid is installed, thus leading to clogging.

Another phenomenon observed in the nanofluids having a single component solid phase known at the state of the art is the tendency of the having the single component solid phase to generate clusters or agglomerations (solids composed by of the combination of various nanometric particles) which have substantially larger dimensions than the individual particles. Also, this phenomenon is negative, since it modifies the properties of the nanofluid and facilitates the tendency to settling and largely increase the abrasion of the fluid, resulting in components failures.

The present disclosure relates to formulations, processes and applications for a heat transfer mixture, such as, for example, a nanofluid having a bicomponent solid phase comprising aluminum oxide nanoparticles and exfoliated graphite nanoplatelets with selected specifications in terms of size properties and morphology as well as the ability to be stably suspended inside a base fluid with a specific chemical composition.

In some embodiments, the disclosed heat transfer fluid comprises a base fluid, a dispersant, a stabilizing agent, aluminum oxide nanoparticles and exfoliated graphite nanoplatelets. The aluminum oxide nanoparticles and exfoliated graphite nanoplatelets define a bicomponent solid phase of the disclosed heat transfer mixture. In some embodiments, the bicomponent solid phase that includes the aluminum oxide nanoparticles and the exfoliated graphite nanoplatelets is dispersed in a liquid phase of the heat transfer mixture, such as, for example, the base fluid of the disclosed heat transfer mixture. The bicomponent solid phase is configured to avoid phonon scattering that might occur at the liquid/solid interphase. The heat transfer mixture of the present disclosure is formulated and processed to maximize heat transfer capability. In some embodiments, the heat transfer mixture can be installed into a thermal system with retrofit solution by feeding the existing heat transfer fluid in the thermal system.

The presence of aluminum oxide nanoparticles and exfoliated graphite nanoplatelets in the bicomponent solid phase of the disclosed heat transfer mixture gives the disclosed heat transfer mixture relevant thermal and fluid dynamic properties compared to the base fluids. Indeed, Exfoliated Graphite (GEX) increases thermal conductivity and specific heat compared to the base fluid (e.g., water) but has no effects on the density of the base fluid. Aluminium oxide nanoparticles increase the thermal conductivity of the base fluid, but reduce the specific heat of the base fluid. Aluminium oxide nanoparticles also increase the density of the base fluid.

The combination of aluminum oxide nanoparticles and exfoliated graphite nanoplatelets in the bicomponent solid phase of the disclosed heat transfer mixture cause an increase of thermal conductivity and specific heat with an increase in density. The combined enhancement of these physical properties leads to an increase on overall heat transfer capacity "h" of the disclosed heat transfer mixture.

The heat transfer mixture of the present disclosure is thus configured to provide a nanofluid having a greater heat exchange capacity than nanofluids having a single component solid phase because it has a high thermal conductivity, a higher density and thermal capacity with respect to the base liquid and to provide a stable nanofluid, in which the bicomponent solid phase has tendency to quickly re-disperse in the liquid phase after deposit on the pipes surface inside which it flows.

In some embodiments, the heat transfer mixture of the present disclosure is an engineered suspension of nanometer-sized solid particles in a base fluid. Suspending small solid particles (aluminum oxide nanoparticles and exfoliated graphite nanoplatelets) in the energy transmission fluids can improve their thermal conductivity and provides an effective and innovative way to enhance their heat transfer characteristics significantly by increasing convective heat transfer in closed loop hydronic systems, and, in doing so, reducing energy demand.

The heat transfer mixture of the present disclosure has a wide range of uses. A typical application is the use of the disclosed heat transfer mixture as a coolant in HVAC and molding systems. It is observed that the use of the disclosed heat transfer mixture as a coolant results in temperature reduction of the discharge valve of the HVAC system due to the improved heat transfer capacity versus coolants known at the state of the art, and thus shows greatly improved performance as an HVAC and molding systems coolant. The disclosed heat transfer mixture can also be used for cooling the motor of the HVAC system. By using the disclosed heat transfer mixture as coolant, the temperature of the cap of the discharge valve and of the valve seat of the HVAC system at maximum power of the motor are lower than in case when a motor of the HVAC system is cooled by water. Therefore, also in case of high heat stressing conditions of the motor, the disclosed heat transfer mixture shows an increased cooling capacity, which provides increased efficiency and motor performance.

The heat transfer mixture of the present disclosure can be applied to various industrial and commercial HVAC systems and related components including chillers, heat exchangers, boilers and energy recovery units. Heat exchangers are sized for certain approach temperatures. The lower the approach operational temperature, the larger the heat exchanger. In fact, the specific surface area of heat exchangers depends on the temperature difference between two thermal fluids. The surface area S of heat exchangers that is needed for exchanging an amount Qtot of heat in time Δt depends also on the involved fluids and on the material properties of the exchanger surface that is even subject to degradation over the time. Because the heat transfer mixture of the present disclosure leads the system fluid to higher thermal conductivity, specific heat and mass flow rate, it increases heat transfer between the air and the thermal fluid, thereby increasing heat exchanger performance.

Figure 3:
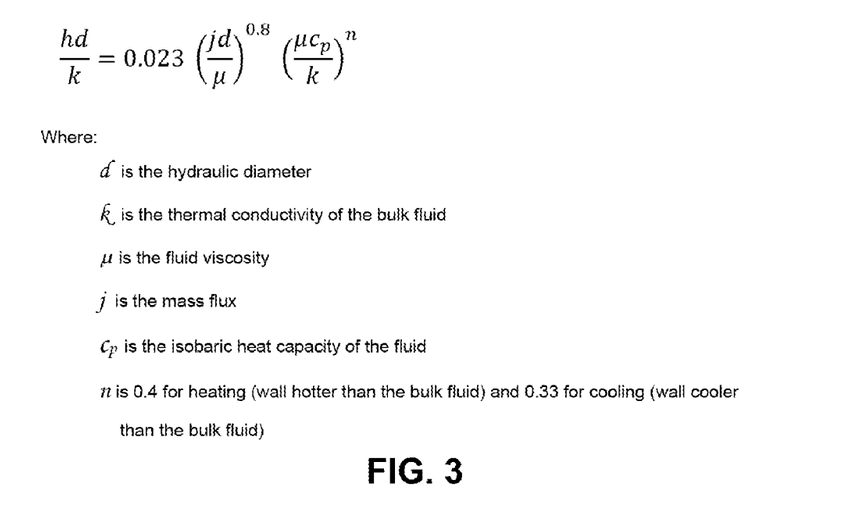
FIG. 3 is a formula for calculating heat transfer capacity.

It has been unexpectedly found that the bicomponent solid phase of the disclosed heat transfer mixture, which includes aluminum oxide nanoparticles and exfoliated graphite nanoplatelets, provides increased heat transfer capacity versus heat mixtures having a single component solid phase, as discussed above and in greater detail hereinbelow. A formula for calculating heat transfer capacity is shown in FIG. 3. Unexpected results was obtained by double component nanofluid compared to the single component nanofluid. In fact the heat transfer capacity of the bi-component nanofluid, despite the same concentration by volume, shows higher performance compared to single component nanofluid made of only one those components. The sum of the contributions from each component in the thermal performance of the nanofluid is lower than the combination of both components together in the nanofluid.

To demonstrate the increased heat transfer capacity of the disclosed heat transfer mixture having a bicomponent solid phase versus heat transfer mixtures having a single component solid phase, the heat transfer capacity was calculated using the formula in FIG. 3 for a heat transfer mixture according to the present disclosure having a bicomponent solid phase, a heat transfer mixture having only aluminum oxide nanoparticles in its solid phase (a single component solid phase) and a heat transfer mixture having only exfoliated graphite nanoplatelets in its solid phase (a single component solid phase). As shown in FIG. 3, the "h" coefficient in thermodynamics is directly proportional to density through the mass flux (j), heat capacity (cp), and thermal conductivity (k).

Figure 4:
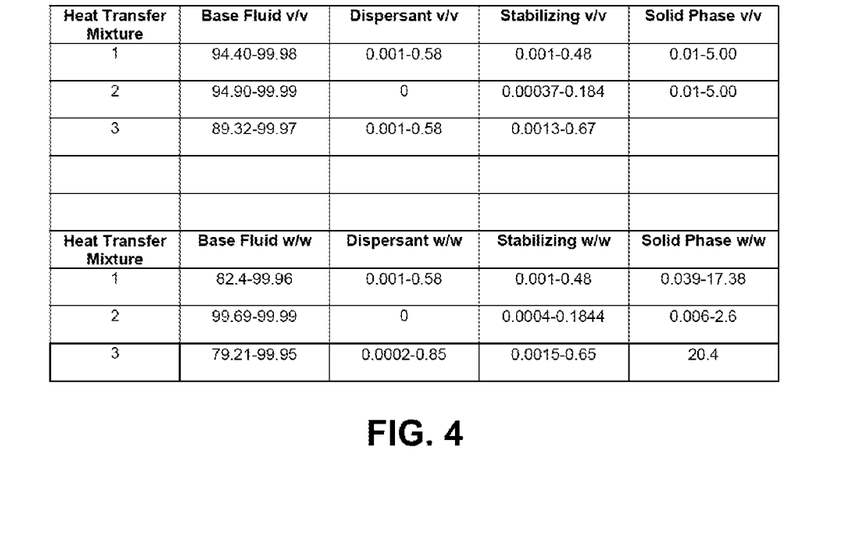
FIG. 4 is a table showing formulations for a heat transfer mixture in accordance with the principles of the present disclosure having a bicomponent solid phase and heat transfer mixtures each including a single component solid phase.

The heat transfer mixture having only aluminum oxide nanoparticles in its solid phase is identified as reference numeral 1 in FIG. 4. The heat transfer mixture having only exfoliated graphite in its solid phase is identified as reference numeral 2 in FIG. 4. The heat transfer mixture according to the present disclosure having a bicomponent solid phase is identified as reference numeral 3 in FIG. 4. As shown in FIG. 4, mixtures 1, 2, 3 differ only in their solid phase and are otherwise identical. That is, while mixture 1 has a single component solid phase that includes 2%/vol of aluminum oxide, mixture 2 includes a single component solid phase that includes the same relative volume of exfoliated graphite and mixture 3 includes a bicomponent solid phase that includes the same relative volume of aluminum oxide and exfoliated graphite.

Figure 5:
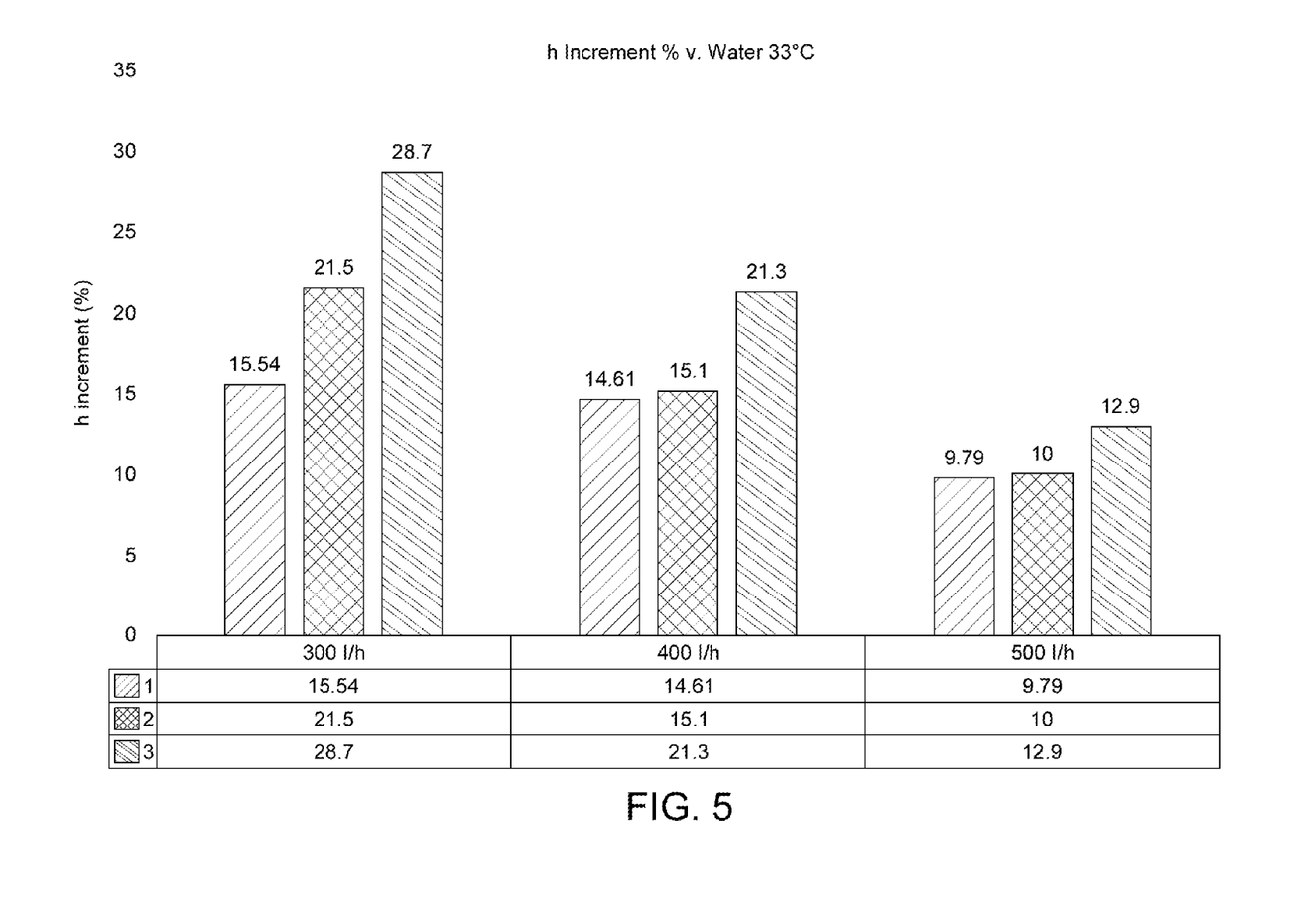
FIG. 5 is a graph showing performance characteristics of a heat transfer mixture in accordance with the principles of the present disclosure having a bicomponent solid phase versus heat transfer mixtures each including a single component solid phase.

Shown in FIG. 5 are the "h" calculations for mixtures 1, 2, 3. Mixtures 1, 2, 3 were each tested using identical protocols under identical conditions to determine the "h" calculations. As shown in FIG. 5, mixture 3 has higher stability compared to mixture 1 and mixture 2 due to the combination between the density increment of the base fluid (1030 g/l) of mixture 3 because of bicomponent solid phase of mixture 3 (the aluminium oxide nanoparticles together with the GEX nanoplatelets (30 g/l)).

As also shown in FIG. 5, mixture 3 has higher re-dispersion capacity than mixture 1 or mixture 2. It is believed that the increased re-dispersion capacity of mixture 3 relative to mixtures 1, 2 is due to the placement of the GEX nanoplatelets between the aluminium oxide nanoparticles, which reduce the adhesiveness (stickiness) of the $Al_2O_3$ nanoparticles.

In some embodiments, the base fluid of the disclosed heat transfer mixture comprises water. In some embodiments, the base fluid of the disclosed heat transfer mixture comprises water and ethylene glycol. In some embodiments, the base fluid of the disclosed heat transfer mixture comprises water and propylene glycol. In some embodiments, the base fluid of the disclosed heat transfer mixture consists of water. In some embodiments, the base fluid of the disclosed heat transfer mixture consists of water and ethylene glycol. In some embodiments, the base fluid of the disclosed heat transfer mixture consists of water and propylene glycol. In some embodiments, the aluminum oxide nanoparticles and/or exfoliated graphite nanoplatelets are homogenously dispersed in the base fluid. In some embodiments, the aluminum oxide nanoparticles and/or exfoliated graphite nanoplatelets are heterogeneously dispersed in the base fluid.

In some embodiments, the base fluid of the disclosed heat transfer mixture comprises between about 80% and about 99% of the heat transfer mixture by volume. In some embodiments, the base fluid of the disclosed heat transfer mixture comprises between 80% and 99% of the heat transfer mixture by volume. In some embodiments, the base fluid of the disclosed heat transfer mixture comprises between about 85% and about 99% of the heat transfer mixture by volume. In some embodiments, the base fluid of the disclosed heat transfer mixture comprises between 85% and 99% of the heat transfer mixture by volume. In some embodiments, the base fluid of the disclosed heat transfer mixture comprises between about 90% and about 99% of the heat transfer mixture by volume. In some embodiments, the base fluid of the disclosed heat transfer mixture comprises between 90% and 99% of the heat transfer mixture by volume. In some embodiments, the base fluid of the disclosed heat transfer mixture comprises between about 95% and about 99% of the heat transfer mixture by volume. In some embodiments, the base fluid of the disclosed heat transfer mixture comprises between 95% and 99% of the heat transfer mixture by volume. In some embodiments, the base fluid of the disclosed heat transfer mixture comprises between about 96% and about 98% of the heat transfer mixture by volume. In some embodiments, the base fluid of the disclosed heat transfer mixture comprises between 96% and 98% of the heat transfer mixture by volume. In some embodiments, the base fluid of the disclosed heat transfer mixture comprises between about 96% and about 97% of the heat transfer mixture by volume. In some embodiments, the base fluid of the disclosed heat transfer mixture comprises between 96% and 97% of the heat transfer mixture by volume. In some embodiments, the base fluid of the disclosed heat transfer mixture comprises between about 97% and about 98% of the heat transfer mixture by volume. In some embodiments, the base fluid of the disclosed heat transfer mixture comprises between 97% and 98% of the heat transfer mixture by volume. In some embodiments, the base fluid of the disclosed heat transfer mixture comprises about 96% of the heat transfer mixture by volume. In some embodiments, the base fluid of the disclosed heat transfer mixture comprises 96% of the heat transfer mixture by volume. In some embodiments, the base fluid of the disclosed heat transfer mixture comprises about 97% of the heat transfer mixture by volume. In some embodiments, the base fluid of the disclosed heat transfer mixture comprises 97% of the heat transfer mixture by volume. In some embodiments, the base fluid of the disclosed heat transfer mixture comprises about 98% of the heat transfer mixture by volume. In some embodiments, the base fluid of the disclosed heat transfer mixture comprises 98% of the heat transfer mixture by volume. In some embodiments, the base fluid of the disclosed heat transfer mixture comprises about 96.1%, about 96.2%, about 96.3%, about 96.4%, about 96.5%, about 96.6%, about 96.7%, about 96.8% or about 96.9% of the heat transfer mixture by volume. In some embodiments, the base fluid of the disclosed heat transfer mixture comprises 96.1%, 96.2%, 96.3%, 96.4%, 96.5%, 96.6%, 96.7%, 96.8% or 96.9% of the heat transfer mixture by volume. In some embodiments, the base fluid of the disclosed heat transfer mixture comprises about 97.1%, about 97.2%, about 97.3%, about 97.4%, about 97.5%, about 97.6%, about 97.7%, about 97.8% or about 97.9% of the heat transfer mixture by volume. In some embodiments, the base fluid of the disclosed heat transfer mixture comprises 97.1%, 97.2%, 97.3%, 97.4%, 97.5%, 97.6%, 97.7%, 97.8% or 97.9% of the heat transfer mixture by volume. In some embodiments, the base fluid of the disclosed heat transfer mixture comprises about 98.1%, about 98.2%, about 98.3%, about 98.4%, about 98.5%, about 98.6%, about 98.7%, about 98.8% or about 98.9% of the heat transfer mixture by volume. In some embodiments, the base fluid of the disclosed heat transfer mixture comprises 97.1%, 97.2%, 97.3%, 97.4%, 97.5%, 97.6%, 97.7%, 97.8% or 97.9% of the heat transfer mixture by volume.

In some embodiments, the aluminum oxide nanoparticles of the disclosed heat transfer mixture comprise between about 1% and about 2% of the heat transfer mixture by volume. In some embodiments, the aluminum oxide nanoparticles of the disclosed heat transfer mixture comprise between 1% and 2% of the heat transfer mixture by volume. In some embodiments, the aluminum oxide nanoparticles of the disclosed heat transfer mixture comprise between about 1% and about 1.5% of the heat transfer mixture by volume. In some embodiments, the aluminum oxide nanoparticles of the disclosed heat transfer mixture comprise between 1% and 1.5% of the heat transfer mixture by volume. In some embodiments, the aluminum oxide nanoparticles of the disclosed heat transfer mixture comprise between about 1.5% and about 2% of the heat transfer mixture by volume. In some embodiments, the aluminum oxide nanoparticles of the disclosed heat transfer mixture comprise between 1.5% and 2% of the heat transfer mixture by volume. In some embodiments, the aluminum oxide nanoparticles of the disclosed heat transfer mixture comprise about 1.1%, about 1.2%, about 1.3%, about 1.4%, about 1.5%, about 1.6%, about 1.7%, about 1.8%, or about 1.9% of the heat transfer mixture by volume. In some embodiments, the aluminum oxide nanoparticles of the disclosed heat transfer mixture comprise 1.1%, 1.2%, 1.3%, 1.4%, 1.5%, 1.6%, 1.7%, 1.8%, or 1.9% % of the heat transfer mixture by volume.

In some embodiments, the aluminum oxide nanoparticles of the disclosed heat transfer mixture comprise between about 2% and about 10% of the heat transfer mixture by weight. In some embodiments, the aluminum oxide nanoparticles of the disclosed heat transfer mixture comprise between 2% and 10% of the heat transfer mixture by weight. In some embodiments, the aluminum oxide nanoparticles of the disclosed heat transfer mixture comprise between about 3% and about 9% of the heat transfer mixture by weight. In some embodiments, the aluminum oxide nanoparticles of the disclosed heat transfer mixture comprise between 3% and 9% of the heat transfer mixture by weight. In some embodiments, the aluminum oxide nanoparticles of the disclosed heat transfer mixture comprise between about 4% and about 8% of the heat transfer mixture by weight. In some embodiments, the aluminum oxide nanoparticles of the disclosed heat transfer mixture comprise between 4% and 8% of the heat transfer mixture by weight. In some embodiments, the aluminum oxide nanoparticles of the disclosed heat transfer mixture comprise between about 4% and about 6% of the heat transfer mixture by weight. In some embodiments, the aluminum oxide nanoparticles of the disclosed heat transfer mixture comprise between 4% and 6% of the heat transfer mixture by weight. In some embodiments, the aluminum oxide nanoparticles of the disclosed heat transfer mixture comprise between about 6% and about 8% of the heat transfer mixture by weight. In some embodiments, the aluminum oxide nanoparticles of the disclosed heat transfer mixture comprise between 6% and 8% of the heat transfer mixture by weight. In some embodiments, the aluminum oxide nanoparticles of the disclosed heat transfer mixture comprise between about 4% and about 7.8% of the heat transfer mixture by weight. In some embodiments, the aluminum oxide nanoparticles of the disclosed heat transfer mixture comprise between 4% and 7.8% of the heat transfer mixture by weight. In some embodiments, the aluminum oxide nanoparticles of the disclosed heat transfer mixture comprise about 4.1%, about 4.2%, about 4.3%, about 4.4%, about 4.5%, about 4.6%, about 4.7%, about 4.8%, about 4.9%, about 5.0%, about 5.1%, about 5.2%, about 5.3%, about 5.4%, about 5.5%, about 5.6%, about 5.7%, about 5.8%, about 5.9%, about 6.0%, about 6.1%, about 6.2%, about 6.3%, about 6.4%, about 6.5%, about 6.6%, about 6.7%, about 6.8%, about 6.9%, about 7.0%, about 7.1%, about 7.2%, about 7.3%, about 7.4%, about 7.5%, about 7.6%, about 7.7%, about 7.8%, or about 7.9% of the heat transfer mixture by weight. In some embodiments, the aluminum oxide nanoparticles of the disclosed heat transfer mixture comprise 4.1%, 4.2%, 4.3%, 4.4%, 4.5%, 4.6%, 4.7%, 4.8%, 4.9%, 5.0%, 5.1%, 5.2%, 5.3%, 5.4%, 5.5%, 5.6%, 5.7%, 5.8%, 5.9%, 6.0%, 6.1%, 6.2%, 6.3%, 6.4%, 6.5%, 6.6%, 6.7%, 6.8%, 6.9%, 7.0%, 7.1%, 7.2%, 7.3%, 7.4%, 7.5%, 7.6%, 7.7%, 7.8%, or 7.9% of the heat transfer mixture by weight.

In some embodiments, the exfoliated graphite nanoplatelets of the disclosed heat transfer mixture comprise between about 0.1% and about 4% of the heat transfer mixture by volume. In some embodiments, the exfoliated graphite nanoplatelets of the disclosed heat transfer mixture comprise between 0.1% and 4% of the heat transfer mixture by volume. In some embodiments, the exfoliated graphite nanoplatelets of the disclosed heat transfer mixture comprise between about 0.2% and about 3% of the heat transfer mixture by volume. In some embodiments, the exfoliated graphite nanoplatelets of the disclosed heat transfer mixture comprise between 0.2% and 3% of the heat transfer mixture by volume. In some embodiments, the exfoliated graphite nanoplatelets of the disclosed heat transfer mixture comprise between about 0.3% and about 3% of the heat transfer mixture by volume. In some embodiments, the exfoliated graphite nanoplatelets of the disclosed heat transfer mixture comprise between 0.3% and 3% of the heat transfer mixture by volume. In some embodiments, the exfoliated graphite nanoplatelets of the disclosed heat transfer mixture comprise between about 0.4% and about 3% of the heat transfer mixture by volume. In some embodiments, the exfoliated graphite nanoplatelets of the disclosed heat transfer mixture comprise between 0.4% and 3% of the heat transfer mixture by volume. In some embodiments, the exfoliated graphite nanoplatelets of the disclosed heat transfer mixture comprise between about 0.5% and about 2% of the heat transfer mixture by volume. In some embodiments, the exfoliated graphite nanoplatelets of the disclosed heat transfer mixture comprise between 0.5% and 2% of the heat transfer mixture by volume. In some embodiments, the exfoliated graphite nanoplatelets of the disclosed heat transfer mixture comprise about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9%, or about 2.0% of the heat transfer mixture by volume. In some embodiments, the exfoliated graphite nanoplatelets of the disclosed heat transfer mixture comprise 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, or 2.0% of the heat transfer mixture by volume.

In some embodiments, the exfoliated graphite nanoplatelets of the disclosed heat transfer mixture comprise between about 0.001% and about 0.1% of the heat transfer mixture by weight. In some embodiments, the exfoliated graphite nanoplatelets of the disclosed heat transfer mixture comprise between 0.001% and 0.1% of the heat transfer mixture by weight. In some embodiments, the exfoliated graphite nanoplatelets comprise less than 0.03% of the heat transfer mixture by weight. In some embodiments, the exfoliated graphite nanoplatelets of the disclosed heat transfer mixture comprise between about 0.005% and about 0.09% of the heat transfer mixture by weight. In some embodiments, the exfoliated graphite nanoplatelets of the disclosed heat transfer mixture comprise between 0.005% and 0.09% of the heat transfer mixture by weight. In some embodiments, the exfoliated graphite nanoplatelets comprise less than 0.03% of the heat transfer mixture by weight. In some embodiments, the exfoliated graphite nanoplatelets of the disclosed heat transfer mixture comprise between about 0.01% and about 0.08% of the heat transfer mixture by weight. In some embodiments, the exfoliated graphite nanoplatelets of the disclosed heat transfer mixture comprise between 0.01% and 0.08% of the heat transfer mixture by weight. In some embodiments, the exfoliated graphite nanoplatelets comprise less than 0.03% of the heat transfer mixture by weight. In some embodiments, the exfoliated graphite nanoplatelets of the disclosed heat transfer mixture comprise between about 0.01% and about 0.07% of the heat transfer mixture by weight. In some embodiments, the exfoliated graphite nanoplatelets of the disclosed heat transfer mixture comprise between 0.01% and 0.07% of the heat transfer mixture by weight. In some embodiments, the exfoliated graphite nanoplatelets comprise less than 0.03% of the heat transfer mixture by weight. In some embodiments, the exfoliated graphite nanoplatelets of the disclosed heat transfer mixture comprise between about 0.015% and about 0.06% of the heat transfer mixture by weight. In some embodiments, the exfoliated graphite nanoplatelets of the disclosed heat transfer mixture comprise between 0.015% and 0.06% of the heat transfer mixture by weight. In some embodiments, the exfoliated graphite nanoplatelets of the disclosed heat transfer mixture comprise about 0.016%, about 0.017%, about 0.018%, about 0.019%, about 0.02%, about 0.021%, about 0.022%, about 0.023%, about 0.024%, about 0.025%, about 0.026%, about 0.027%, about 0.028%, about 0.029%, about 0.03%, about 0.031%, about 0.032%, about 0.033%, about 0.034%, about 0.035%, about 0.036%, about 0.037%, about 0.038%, about 0.039%, about 0.04%, about 0.041%, about 0.042%, about 0.043%, about 0.044%, about 0.045%, about 0.046%, about 0.047%, about 0.048%, about 0.049%, about 0.05%, about 0.051%, about 0.052%, about 0.053%, about 0.054%, about 0.055%, about 0.056%, about 0.057%, about 0.058%, or about 0.059% of the heat transfer mixture by weight. In some embodiments, the exfoliated graphite nanoplatelets of the disclosed heat transfer mixture comprise 0.016%, 0.017%, 0.018%, 0.019%, 0.02%, 0.021%, 0.022%, 0.023%, 0.024%, 0.025%, 0.026%, 0.027%, 0.028%, 0.029%, 0.03%, 0.031%, 0.032%, 0.033%, 0.034%, 0.035%, 0.036%, 0.037%, 0.038%, 0.039%, 0.04%, 0.041%, 0.042%, 0.043%, 0.044%, 0.045%, 0.046%, 0.047%, 0.048%, 0.049%, 0.05%, 0.051%, 0.052%, 0.053%, 0.054%, 0.055%, 0.056%, 0.057%, 0.058%, or 0.059% of the heat transfer mixture by weight.

In some embodiments, the exfoliated graphite nanoplatelets comprise less than 0.1% of the heat transfer mixture by weight. In some embodiments, the exfoliated graphite nanoplatelets comprise less than 0.09% of the heat transfer mixture by weight. In some embodiments, the exfoliated graphite nanoplatelets comprise less than 0.08% of the heat transfer mixture by weight. In some embodiments, the exfoliated graphite nanoplatelets comprise less than 0.07% of the heat transfer mixture by weight. In some embodiments, the exfoliated graphite nanoplatelets comprise less than 0.06% of the heat transfer mixture by weight. In some embodiments, the exfoliated graphite nanoplatelets comprise less than 0.05% of the heat transfer mixture by weight. In some embodiments, the exfoliated graphite nanoplatelets comprise less than 0.04% of the heat transfer mixture by weight. In some embodiments, the exfoliated graphite nanoplatelets comprise less than 0.03% of the heat transfer mixture by weight. In some embodiments, the exfoliated graphite nanoplatelets comprise less than 0.02% of the heat transfer mixture by weight.

In some embodiments, the exfoliated graphite nanoplatelets of the disclosed heat transfer mixture are between about 1 nanometer and about 30 nanometers in width and between about 1,000 nanometers and about 100,000 nanometers in length. In some embodiments, the exfoliated graphite nanoplatelets of the disclosed heat transfer mixture are between 1 nanometer and 30 nanometers in width and between 1,000 nanometers and 100,000 nanometers in length. In some embodiments, the exfoliated graphite nanoplatelets of the disclosed heat transfer mixture are between about 2 nanometers and about 20 nanometers in width and between about 2,000 nanometers and about 75,000 nanometers in length. In some embodiments, the exfoliated graphite nanoplatelets of the disclosed heat transfer mixture are between 2 nanometers and 20 nanometers in width and between 2,000 nanometers and 50,000 nanometers in length. In some embodiments, the exfoliated graphite nanoplatelets of the disclosed heat transfer mixture are between about 3 nanometers and about 15 nanometers in width and between about 3,500 nanometers and about 60,000 nanometers in length. In some embodiments, the exfoliated graphite nanoplatelets of the disclosed heat transfer mixture are between 3 nanometers and 15 nanometers in width and between 3,500 nanometers and 60,000 nanometers in length. In some embodiments, the exfoliated graphite nanoplatelets of the disclosed heat transfer mixture are between about 5 nanometers and about 10 nanometers in width and between about 5,000 nanometers and about 50,000 nanometers in length. In some embodiments, the exfoliated graphite nanoplatelets of the disclosed heat transfer mixture are between 5 nanometers and 10 nanometers in width and between 5,000 nanometers and 50,000 nanometers in length.

In some embodiments, the exfoliated graphite nanoplatelets of the disclosed heat transfer mixture are about 5.1 nanometers, about 5.2 nanometers, about 5.3 nanometers, about 5.4 nanometers, about 5.5 nanometers, about 5.6 nanometers, about 5.7 nanometers, about 5.8 nanometers, about 5.9 nanometers, about 6.0 nanometers, about 6.1 nanometers, about 6.2 nanometers, about 6.3 nanometers, about 6.4 nanometers, about 6.5 nanometers, about 6.6 nanometers, about 6.7 nanometers, about 6.8 nanometers, about 6.9 nanometers, about 7.0 nanometers, about 7.1 nanometers, about 7.2 nanometers, about 7.3 nanometers, about 7.4 nanometers, about 7.5 nanometers, about 7.6 nanometers, about 7.7 nanometers, about 7.8 nanometers, about 7.9 nanometers, about 8.0 nanometers, about 8.1 nanometers, about 8.2 nanometers, about 8.3 nanometers, about 8.4 nanometers, about 8.5 nanometers, about 8.6 nanometers, about 8.7 nanometers, about 8.8 nanometers, about 8.9 nanometers, about 9.0 nanometers, about 9.1 nanometers about, 9.2 nanometers, about 9.3 nanometers, about 9.4 nanometers, about 9.5 nanometers, about 9.6 nanometers, about 9.7 nanometers, about 9.8 nanometers, or about 9.9 nanometers in width. In some embodiments, the exfoliated graphite nanoplatelets of the disclosed heat transfer mixture are 5.1 nanometers, 5.2 nanometers, 5.3 nanometers, 5.4 nanometers, 5.5 nanometers, 5.6 nanometers, 5.7 nanometers, 5.8 nanometers, 5.9 nanometers, 6.0 nanometers, 6.1 nanometers, 6.2 nanometers, 6.3 nanometers, 6.4 nanometers, 6.5 nanometers, 6.6 nanometers, 6.7 nanometers, 6.8 nanometers, 6.9 nanometers, 7.0 nanometers, 7.1 nanometers, 7.2 nanometers, 7.3 nanometers, 7.4 nanometers, 7.5 nanometers, 7.6 nanometers, 7.7 nanometers, 7.8 nanometers, 7.9 nanometers, 8.0 nanometers, 8.1 nanometers, 8.2 nanometers, 8.3 nanometers, 8.4 nanometers, 8.5 nanometers, 8.6 nanometers, 8.7 nanometers, 8.8 nanometers, 8.9 nanometers, 9.0 nanometers, 9.1 nanometers, 9.2 nanometers, 9.3 nanometers, 9.4 nanometers, 9.5 nanometers, 9.6 nanometers, 9.7 nanometers, 9.8 nanometers, or 9.9 nanometers in width.

In some embodiments, the exfoliated graphite nanoplatelets of the disclosed heat transfer mixture are about 6,000 nanometers, about 7,000 nanometers, about 8,000 nanometers, about 9,000 nanometers, about 10,000 nanometers, about 11,000 nanometers, about 12,000 nanometers, about 13,000 nanometers, about 14,000 nanometers, about 15,000 nanometers, about 16,000 nanometers, about 17,000 nanometers, about 18,000 nanometers, about 19,000 nanometers, about 20,000 nanometers, about 21,000 nanometers, about 22,000 nanometers, about 23,000 nanometers, about 24,000 nanometers, about 25,000 nanometers, about 26,000 nanometers, about 27,000 nanometers, about 28,000 nanometers about 29,000 nanometers, about 30,000 nanometers, about 31,000 nanometers, about 32,000 nanometers, about 33,000 nanometers, about 34,000 nanometers, about 35,000 nanometers, about 36,000 nanometers, about 37,000 nanometers, about 38,000 nanometers, about 39,000 nanometers, about 40,000 nanometers, about 41,000 nanometers, about 42,000 nanometers, about 43,000 nanometers, about 44,000 nanometers, about 45,000 nanometers, about 46,000 nanometers, about 47,000 nanometers, about 48,000 nanometers, or about 49,000 nanometers in length. In some embodiments, the exfoliated graphite nanoplatelets of the disclosed heat transfer mixture are 6,000 nanometers, 7,000 nanometers, 8,000 nanometers, 9,000 nanometers, 10,000 nanometers, 11,000 nanometers, 12,000 nanometers, 13,000 nanometers, 14,000 nanometers, 15,000 nanometers, 16,000 nanometers, 17,000 nanometers, 18,000 nanometers, 19,000 nanometers, 20,000 nanometers, 21,000 nanometers, 22,000 nanometers, 23,000 nanometers, 24,000 nanometers, 25,000 nanometers, 26,000 nanometers, 27,000 nanometers, 28,000 nanometers 29,000 nanometers, 30,000 nanometers, 31,000 nanometers, 32,000 nanometers, 33,000 nanometers, 34,000 nanometers, 35,000 nanometers, 36,000 nanometers, 37,000 nanometers, 38,000 nanometers, 39,000 nanometers, 40,000 nanometers, 41,000 nanometers, 42,000 nanometers, 43,000 nanometers, 44,000 nanometers, 45,000 nanometers, 46,000 nanometers, 47,000 nanometers, 48,000 nanometers, or 49,000 nanometers in length.

In some embodiments, the exfoliated graphite nanoplatelets of the disclosed heat transfer mixture have a specific surface area less than about 100 $m^2/g$. In some embodiments, the exfoliated graphite nanoplatelets of the disclosed heat transfer mixture have a specific surface arealess than 100 $m^2/g$. In some embodiments, the exfoliated graphite nanoplatelets of the disclosed heat transfer mixture have a specific surface area less than about 90 $m^2/g$. In some embodiments, the exfoliated graphite nanoplatelets of the disclosed heat transfer mixture have a specific surface area less than 90 nanometers $m^2/g$. In some embodiments, the exfoliated graphite nanoplatelets of the disclosed heat transfer mixture have a specific surface area less than about 80 $m^2/g$. In some embodiments, the exfoliated graphite nanoplatelets of the disclosed heat transfer mixture have a specific surface area less than 80 $m^2/g$. In some embodiments, the exfoliated graphite nanoplatelets of the disclosed heat transfer mixture have a specific surface area less than about 70 $m^2/g$. In some embodiments, the exfoliated graphite nanoplatelets of the disclosed heat transfer mixture have a specific surface area less than 70 $m^2/g$. In some embodiments, the exfoliated graphite nanoplatelets of the disclosed heat transfer mixture have a specific surface area less than about 60 $m^2/g$. In some embodiments, the exfoliated graphite nanoplatelets of the disclosed heat transfer mixture have a specific surface area less than 60 $m^2/g$.

In some embodiments, the disclosed heat transfer mixture is free of oil. In some embodiments, the disclosed heat transfer mixture is free of petroleum and/or petroleum derivatives. In some embodiments, the disclosed heat transfer mixture is free of grease and/or grease derivatives. In some embodiments, the disclosed heat transfer mixture is free of $Fe_2O_3$ and/or CuO nanoparticles and/or nanoplatelets. In some embodiments, the disclosed heat transfer mixture is free of non-graphite carbon, including, for example, carbon nanoparticles and/or nanoplatelets that do not include graphite. In some embodiments, the disclosed heat transfer mixture is free of non-exfoliated graphite. In some embodiments, the disclosed heat transfer mixture is free of exfoliated graphite nanoparticles. In some embodiments, the disclosed heat transfer mixture is free of non-metal nanoparticles. In some embodiments, the disclosed heat transfer mixture is free of metal nanoplatelets. In some embodiments, the disclosed heat transfer mixture is free of nanotubes. In some embodiments, the disclosed heat transfer mixture is free of surfactants. In some embodiments, the disclosed heat transfer mixture is free of polycarboxylic acids and/or salts thereof. In some embodiments, the disclosed heat transfer mixture is free of metal corrosion inhibitors. In some embodiments, the disclosed heat transfer mixture includes one or more surfactants having a net positive charge. In some embodiments, the disclosed heat transfer mixture has a pH below the pH of the aluminum oxide nanoparticles and/or the exfoliated graphite nanoplatelets of the disclosed heat transfer mixture. In some embodiments, the disclosed heat transfer mixture has a pH greater than 9.0. In some embodiments, the disclosed heat transfer mixture is hydrophilic for use as a coolant, for example. In some embodiments, the exfoliated graphite nanoplatelets of the disclosed heat transfer mixture are produced by a process that does not include plasma.

In some embodiments, the disclosed heat transfer mixture is suitable for use as a lubricant due to the lubricious qualities of the combination of the graphene nanoplatelets and the aluminium oxide nanoparticles in the bicompound solid phase of the disclosed heat transfer mixture. For example, the tribological properties of the aluminium oxide nanoparticles are reinforced by the exfoliated graphite nanoplatelets of the bicomponent solid phase of the disclosed heat transfer mixture, which lead to lubricious conditions. Indeed, it has been found that dispersion with only metal oxide nanoparticles showed higher coefficient of friction (COF) than the combination of aluminium oxide nanopaticles and exfoliated graphite nanoplatelets inside the dispersion, since the combination of $Al_2O_3$ nanoparticles and exfoliated graphite nanoplatelets showed reduction in COF with an increased load.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A heat transfer mixture comprising:
a base fluid;
a dispersant;

a stabilizing agent comprising polyglycol ether and a rheology viscosifier, the rheology viscosifier comprising polysaccharide phospholipids;
aluminum oxide nanoparticles having an average particle size between 200 nanometers and 600 nanometers; and
exfoliated graphite nanoplatelets,
wherein the heat transfer mixture has a pH greater than 9.0.

2. The heat transfer mixture recited in claim 1, wherein the base fluid consists of water.

3. The heat transfer mixture recited in claim 1, wherein the base fluid consists of water and ethylene glycol.

4. The heat transfer mixture recited in claim 1, wherein the base fluid consists of water and propylene glycol.

5. The heat transfer mixture recited in claim 1, wherein the base fluid comprises between 96% and 98% of the heat transfer mixture by volume, the base fluid being selected from the group consisting of water, water and ethylene glycol and water and propylene glycol.

6. The heat transfer mixture recited in claim 1, wherein the base fluid comprises greater than 96% of the heat transfer mixture by volume, the base fluid being selected from the group consisting of water, water and ethylene glycol and water and propylene glycol.

7. The heat transfer mixture recited in claim 1, wherein the dispersant comprises between 0.001% and 0.6% of the heat transfer mixture by volume.

8. The heat transfer mixture recited in claim 1, wherein the stabilizing agent comprises between 0.001% and 0.7% of the heat transfer mixture by volume.

9. The heat transfer mixture recited in claim 1, wherein the aluminum oxide nanoparticles comprise between 1% and 2% of the heat transfer mixture by volume.

10. The heat transfer mixture recited in claim 1, wherein the aluminum oxide nanoparticles comprise between 4% and 7.8% of the heat transfer mixture by weight.

11. The heat transfer mixture recited in claim 1, wherein the exfoliated graphite nanoplatelets comprise between 0.5% and 2% of the heat transfer mixture by volume.

12. The heat transfer mixture recited in claim 1, wherein the exfoliated graphite nanoplatelets comprise between 0.015% and 0.06% of the heat transfer mixture by weight.

13. The heat transfer mixture recited in claim 1, wherein the exfoliated graphite nanoplatelets comprise less than 0.03% of the heat transfer mixture by weight.

14. The heat transfer mixture recited in claim 1, wherein the thicknesses of the exfoliated graphite nanoplatelets are between 5 nanometers and 5.9 nanometers and the lengths of the exfoliate graphite nanoplatelets are between 6,000 nanometers and 50,000 nanometers.

15. The heat transfer mixture recited in claim 1, wherein the thicknesses of the exfoliated graphite nanoplatelets are between 5 nanometers and 5.7 nanometers and the lengths of the exfoliate graphite nanoplatelets are between 7,000 nanometers and 50,000 nanometers, the exfoliated graphite nanoplatelets comprising between 0.5% and 2% of the heat transfer mixture by volume.

16. The heat transfer mixture recited in claim 1, wherein the thicknesses of the exfoliated graphite nanoplatelets are between 5 nanometers and 5.5 nanometers and the lengths of the exfoliate graphite nanoplatelets are between 8,000 nanometers and 50,000 nanometers in length, the exfoliated graphite nanoplatelets comprising between 0.015% and 0.06% of the heat transfer mixture by weight.

17. The heat transfer mixture recited in claim 1, wherein the exfoliated graphite nanoplatelets have a specific surface area less than 60 $m^2/g$.

18. A heat transfer mixture comprising:
a base fluid;
a dispersant;
a stabilizing agent comprising polyglycol ether and a rheology viscosifier, the rheology viscosifier comprising polysaccharide phospholipids;
aluminum oxide nanoparticles having an average particle size between 200 nanometers and 600 nanometers; and
exfoliated graphite nanoplatelets having a specific surface area less than 60 $m^2/g$,
wherein the base fluid comprises between 96% and 98% of the heat transfer mixture by volume, the base fluid being selected from the group consisting of water, water and ethylene glycol and water and propylene glycol,
wherein the dispersant comprises between 0.001% and 0.6% of the heat transfer mixture by volume,
wherein the stabilizing agent comprises between 0.001% and 0.7% of the heat transfer mixture by volume,
wherein the aluminum oxide nanoparticles comprise between 1% and 2% of the heat transfer mixture by volume,
wherein the exfoliated graphite nanoplatelets comprise between 0.5% and 2% of the heat transfer mixture by volume, and
wherein the heat transfer mixture has a pH greater than 9.0.

19. A heat transfer mixture consisting of:
a base fluid;
a dispersant;
a stabilizing agent polyglycol ether and a rheology viscosifier, the rheology viscosifier comprising polysaccharide phospholipids;
aluminum oxide nanoparticles having an average particle size between 200 nanometers and 600 nanometers; and
exfoliated graphite nanoplatelets having a specific surface area less than 60 $m^2/g$,
wherein the base fluid comprises between 96% and 98% of the heat transfer mixture by volume, the base fluid being selected from the group consisting of water, water and ethylene glycol and water and propylene glycol,
wherein the dispersant comprises between 0.001% and 0.6% of the heat transfer mixture by volume,
wherein the stabilizing agent comprises between 0.001% and 0.7% of the heat transfer mixture by volume,
wherein the aluminum oxide nanoparticles comprise between 1% and 2% of the heat transfer mixture by volume,
wherein the exfoliated graphite nanoplatelets comprise between 0.5% and 2% of the heat transfer mixture by volume, and
wherein the heat transfer mixture has a pH greater than 9.0.

* * * * *